(12) United States Patent
Ryali et al.

(10) Patent No.: US 9,558,466 B2
(45) Date of Patent: Jan. 31, 2017

(54) METHODS FOR CALCULATING RETURN ON INVESTMENT FOR A CONTACT CENTER AND DEVICES THEREOF

(71) Applicant: Infosys Limited, Bangalore (IN)

(72) Inventors: Venkata Murali Krishna Ryali, Bangalore (IN); Sriram Radhakkrishnan, Chennai (IN); Ramnath Soleswaran, Chennai (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/220,525

(22) Filed: Mar. 20, 2014

(65) Prior Publication Data

US 2014/0379538 A1 Dec. 25, 2014

(30) Foreign Application Priority Data

Jun. 24, 2013 (IN) .......................... 2902/CHE/2013

(51) Int. Cl.
 *G07F 19/00* (2006.01)
 *G06Q 10/06* (2012.01)
(52) U.S. Cl.
 CPC ................. *G06Q 10/0639* (2013.01)
(58) Field of Classification Search
 CPC ........ G06Q 40/10; G06Q 40/02; G06Q 40/00; G06Q 30/04; G06Q 20/10
 USPC .......................................................... 705/30
 See application file for complete search history.

(56) References Cited

U.S. PATENT DOCUMENTS

| | | | |
|---|---|---|---|
| 7,647,260 B2 | 1/2010 | Milleker et al. | |
| 7,752,055 B1 | 7/2010 | Partezana | |
| 8,441,516 B2 * | 5/2013 | Satyanarayanan | .. H04L 12/1822 348/14.08 |
| 2005/0209944 A1 | 9/2005 | Ballow et al. | |
| 2008/0288337 A1 | 11/2008 | Snyder et al. | |
| 2008/0306793 A1 * | 12/2008 | Berstis | ................ G06Q 10/063 705/7.11 |

OTHER PUBLICATIONS

"ROI Estimator", http://www.rightnow.com/resource-tool-roi.php, retrieved on Mar. 12, 2012.
(Continued)

*Primary Examiner* — Garcia Ade
(74) *Attorney, Agent, or Firm* — LeClairRyan, a Professional Corporation

(57) ABSTRACT

A method, non-transitory computer readable medium, and account manager device comprises obtaining a plurality of inputs associated with the contact center in response to a request to calculate the return on investment associated with the contact center, wherein the plurality of inputs includes one or more contact center historical data and one or more contact center projected data. At least a part of the obtained one or more contact center historical data is compared against the one or more contact center projected data to identify one or more improvement areas in the contact center. One or more costs to implement the identified one or more improvement areas in the contact center are determined. The return of investment associated to the contact center is determined based on the one or more determined costs. The determined return on investment associated to the contact center is provided.

15 Claims, 3 Drawing Sheets

(56) References Cited

OTHER PUBLICATIONS

"Call Center Calculator (Ansapoint)", http://www.erlang.com/calculator/call, retrieved on Mar. 12, 2012.
Anton et al., "How to Conduct a Call Center Performance Audit: A to Z," Petouhoff, N., ed., The Anton Press: Santa Maria, CA, pp. 1-35 (Jul. 2004).
Zeacom, Zeacom and 5i Launch RoI Calculator to Demonstrate Tangible Benefits of Unified Communications, http://extranet.zeacom.com/media/pdf/Media%20Release%20-%205i%20zcc%Roi%20calculator%20Final.pdf, retrieved on Mar. 20, 2014.

* cited by examiner

| Sr. No | Description | Actual values |
|---|---|---|
| 1 | Total number of calls | 154,068 |
| 2 | Agent talk time | 560 hours |
| 3 | Call hours per agent | 3 hours |
| 4 | Hold time | 10 hours |
| 5 | IVR call minutes | 36000 minutes |
| 6 | Telecom cost | $75,000 |
| 7 | Agent cost per minute | $300 |
| 8 | Revenue generated | $1,000,000 |
| 9 | Break even period | 8 years |

FIG. 3

| Sr. No | Description | Actual values |
|---|---|---|
| 1 | Hold time | 6 hours |
| 2 | Repeat/Misrouted calls | 150 |
| 3 | Increase in IVR usage | 50000 minutes |
| 4 | Hardware and software cost | $100,000 |

FIG. 4

METHODS FOR CALCULATING RETURN ON INVESTMENT FOR A CONTACT CENTER AND DEVICES THEREOF

RELATED APPLICATION

This application claims the benefit of Indian Patent Application Filing No. 2902/CHE/2013, filed Jun. 24, 2013, which is hereby incorporated by reference in its entirety.

FIELD

This technology generally relates to methods for calculating return of investment for contact center and devices thereof.

BACKGROUND

A contact center is a facility used by companies to manage all client contact through a variety of mediums such as telephone, fax, letter, e-mail and online live-chat.

Contact centers can also offer a number of different services. One of the most popular is the support help desk, which regularly answers technical questions from customers and assists them using their equipment or software. However, not all contact centers operate at full efficiency and changes to the infrastructure such as hardware, software process are required from time to time. Identifying the changes to implement in the contact center is a challenging task and calculating the cost associated with these changes is even more difficult. In addition to identifying the changes and cost associated with the changes, senior management or a customer would also like to know the return on investment before investing on the contact center. The existing technologies fail to provide a return on investment and other associated information such as break even period, savings.

SUMMARY

A method for calculating a return on investment for a contact center includes an account manager computing device obtaining a plurality of inputs associated with the contact center in response to a request to calculate the return on investment associated with the contact center, wherein the plurality of inputs includes one or more contact center historical data and one or more contact center projected data. At least a part of the obtained one or more contact center historical data is compared against the one or more contact center projected data to identify one or more improvement areas in the contact center by the account manager computing device. One or more costs to implement the identified one or more improvement areas in the contact center are determined by the account manager computing device. The return of investment associated to the contact center is determined based on the one or more determined costs by the account manager computing device. The determined return on investment associated to the contact center is provided by the account manager computing device.

A non-transitory computer readable medium having stored thereon instructions for analyzing user opinions comprising machine executable code which when executed by at least one processor, causes the processor to perform steps including includes obtaining a plurality of inputs associated with the contact center in response to a request to calculate the return on investment associated with the contact center, wherein the plurality of inputs includes one or more contact center historical data and one or more contact center projected data. At least a part of the obtained one or more contact center historical data is compared against the one or more contact center projected data to identify one or more improvement areas in the contact center. One or more costs to implement the identified one or more improvement areas in the contact center are determined. The return of investment associated to the contact center is determined based on the one or more determined costs. The determined return on investment associated to the contact center is provided.

An account manager computing device comprising one or more processors, a memory, wherein the memory coupled to the one or more processors which are configured to execute programmed instructions stored in the memory including obtaining a plurality of inputs associated with the contact center in response to a request to calculate the return on investment associated with the contact center, wherein the plurality of inputs includes one or more contact center historical data and one or more contact center projected data. At least a part of the obtained one or more contact center historical data is compared against the one or more contact center projected data to identify one or more improvement areas in the contact center. One or more costs to implement the identified one or more improvement areas in the contact center are determined. The return of investment associated to the contact center is determined based on the one or more determined costs. The determined return on investment associated to the contact center is provided.

This technology provides a number of advantages including providing more effective methods, non-transitory computer readable medium and devices for calculating return on investment for a contact center. Additionally, this technology would enable an investor or customer to get projections on savings based on the investment forecast on one or more contact center applications, the break even period associated with the contact center after the investment.

BRIEF DESCRIPTION OF THE DRAWINGS

FIG. 3 is an exemplary table illustrating one or more historical data; and

FIG. 4 is an exemplary table illustrating one or more projected data.

DETAILED DESCRIPTION

Figure 1:
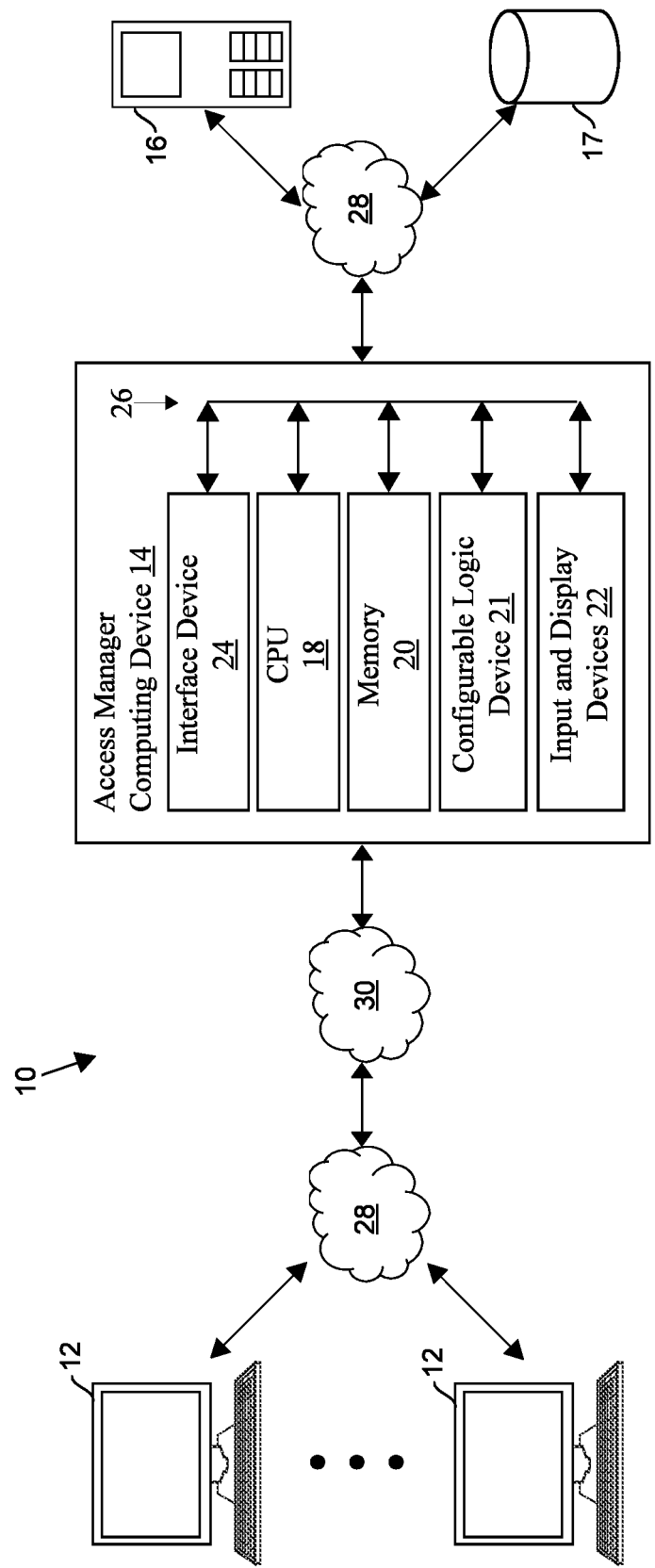
FIG. 1 is a block diagram of an exemplary network environment which an account manger computing device for calculating return on investment for a contact center.

An exemplary network environment 10 with an account manager computing device 14 for calculating return on investment in FIG. 1. The exemplary environment 10 includes a plurality of client computing devices 12, the account manager computing device 14, a historical data server 16 and a forecasted data server 17 which are coupled together by local area networks (LANs) 28 and wide area network (WAN) 30, although the environment can include other types and numbers of devices, components, elements and communication networks in other topologies and deployments. This technology provides a number of advantages including providing projections of return on investment, break even period and the savings associated with the contact center.

Referring more specifically to FIG. 1, the account manager computing device 14 is coupled to client computing devices 12 through one of the LANs 28, WANs 30 although the client computing devices 12 and account manager computing device 14 may be coupled together via other topologies. Additionally, the account manager computing device 14 is coupled to the historical data server 16 and the forecasted data server 17 through the WAN 30, although the historical data server 16, the forecasted data server 17 and the account manager computing device 14 may be coupled together via other topologies.

The account manager computing device 14 assists with calculating return on investment as illustrated and described with the examples herein, although the account manager computing device 14 may perform other types and numbers of functions. Account manager computing device 14 includes at least one processor 18, memory 20, configurable logic device 21, input and display devices 22, and interface device 24 which are coupled together by bus 26, although account manager computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
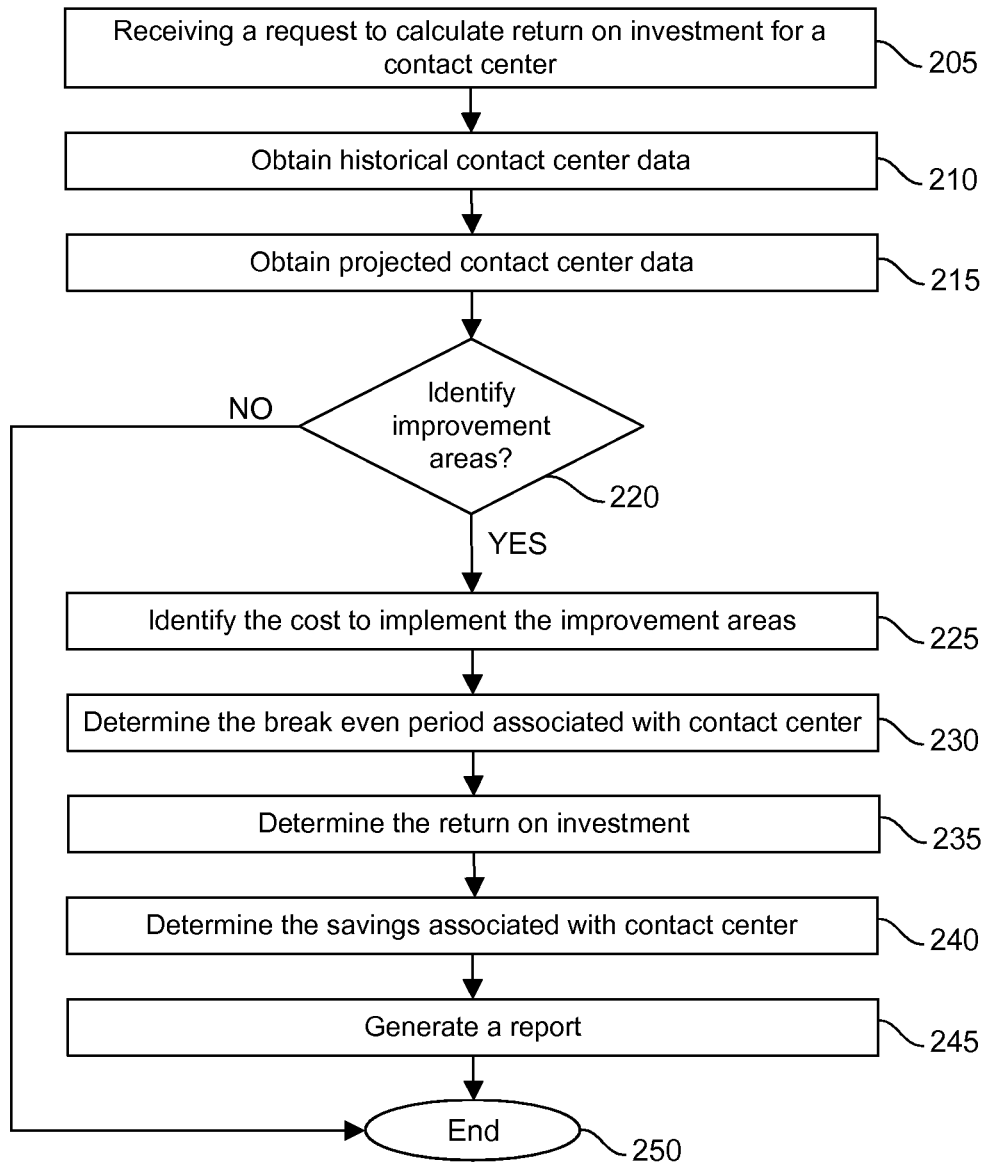
FIG. 2 is a flowchart of an exemplary method for calculating return on investment for the contact center.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 2 is representative of example steps or actions of this technology that may be embodied or expressed as one or more non-transitory computer or machine readable instructions stored in memory 20 that may be executed by the processor(s) 18 and/or may be implemented by configured logic in the configurable logic device 21.

The configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits (ASICs") and/or programmable logic units ("PLUs").

Input and display devices 22 enable a user, such as an administrator, to interact with the account manager computing device 14, such as to input and/or view data and/or to configure, program and/or operate it by way of example only. Input devices may include a keyboard and/or a computer mouse and/or touch screen devices and display devices may include a computer monitor and/or touch screen devices, although other types and numbers of input devices and display devices could be used.

The interface device 24 in the access manager computing device 14 is used to operatively couple and communicate between the account manager computing device 14, the client computing devices 12, the historical data server 16 and the forecasted data server 17 which are all coupled together by one or more of the local area networks (LAN) 28 and/or the wide area network (WAN) 30, although other types and numbers of communication networks or systems with other types and numbers of connections and configurations to other devices and elements. By way of example only, the local area networks (LAN) 28 and the wide area network (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12, the historical data server 16 and the forecasted data server 17 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server based applications at the historical data server 16 and the forecasted data server 17 via the LANs 28 and/or WANs 30.

Historical data server 16 process requests received from the account manager computing device 14 via WANs 30 according to the HTTP-based application RFC protocol or the CIFS or NFS protocol in this example, but the principles discussed herein are not limited to this example and can include other application protocols. A series of applications may run on the historical data server 16 that allow the transmission of data, such as a data file or metadata, requested by the account manager computing device 14. The historical data server 16 may provide data or receive data in response to requests directed toward the respective applications on the historical data server 16 from the account manager computing device 14. It is to be understood that the historical data server 16 may be hardware or software or may represent a system with multiple historical data servers 16, which may include internal or external networks. In this example the historical data server 16 may be any version of Microsoft® IIS servers or Apache® servers, although other types of servers may be used.

In this example, the exemplary environment 10 includes a forecasted data server 17. The forecasted data server 17 process requests received from the account manager computing device 14 via WANs 30 according to the HTTP-based application RFC protocol or the CIFS or NFS protocol in this example, but the principles discussed herein are not limited to this example and can include other application protocols. A series of applications may run on the forecasted data server 17 that allow the transmission of data, such as a data file or metadata, requested by the account manager computing device 14. The forecasted data server 17 may provide data or receive data in response to requests directed toward the respective applications on the forecasted data server 17 from the account manager computing device 14. It is to be understood that forecasted data server 17 may be hardware or software or may represent a system with multiple forecasted data servers 17, which may include internal or external networks. In this example forecasted data server 17 may be any version of Microsoft® IIS servers or Apache® servers, although other types of servers may be used.

Although an exemplary network environment 10 with the client computing devices 12, the account manager computing device 14, historical data server 16, forecasted data server 17, the LANs 28 and the WAN 30 are described and illustrated herein, other types and numbers of systems, devices, blades, components, and elements in other topologies can be used. It is to be understood that the methods of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for calculating return on investment will now be described with reference to FIGS. 1-4. In step 205, the account manager computing device 14 receives a request to calculate return on investment for a contact center sent from a client computing device 12. Contact center relates to a facility used by companies to manage all client contact through a variety of mediums such as telephone, fax, letter, e-mail and online live-chat.

In step 210, the account manager computing device 14 obtains one or more contact center historical data from the historical data server 16 associated with the contact center requested in step 205. In this example, the one or more contact center historical data is dynamically obtained by the account manager computing device 14. The historical data relates to contact center data which has been stored in the historical data server 16 over a period of time as illustrated in FIG. 3. By way of example only, the one or more contact center historical data includes total calls, agent talk time, call hours per agent, hold time, IVR call minutes, telecom cost, agent cost per minute, revenue generated by the contact center, break even period although any other historical data relating to the contact center data can be obtained.

In step 215, the account manager computing device 14 obtains one or more contact center projected data associated with contact center from the forecasted data server 17. In this example, the account manager computing device 14 dynamically obtains the one or more contact center projected data from the forecasted data server 17. Additionally, in this example, one or more contact center projected data relates to a forecasted data of the contact center for reduction in agent interaction, hold time, repeat/misrouted calls, increase in IVR usage and associated hardware and software and cost for the revamp and maintenance as illustrated in FIG. 4, although the one or more contact center projected data can include any other contact center related data.

In step 220, the account manager computing device 14 identifies one or more improvement areas in the contact center by comparing the one or more historical data obtained in step 210 and the one or more projected data obtained in step 215. If the account manager computing device 14 identifies one or more improvement areas, a Yes branch is taken to step 225, else a No branch is taken to step 250 to end the process.

In step 225, the account manager computing device 14 identifies the cost to implement the identified one or more improvement areas in the contact center based on parameters such as investment required in the establishment of the identified one or more improvement areas and the maintenance of the infrastructure of the one or more improvement areas, although the account manager computing device 14 can identify the cost to implement the identified one or more improvement areas by considering any other parameters.

In step 230, the account manager computing device 14 determines the break even period associated with the contact center by identifying the number of years required by the contact center to generate revenue after implementing the identified one or more improvement areas to be equal to the cost to implement the identified one or more improvement areas in the contact center, although the account manager computing device 14 may use any other techniques/methods to determine the break even period.

In step 235, the account manager computing device 14 determines the return on investment of the contact center by calculating the revenue generated by the contact center over a period of time after the determined break even period, although the account manager computing device 14 can use any other methods or techniques to determine the return on investment. Additionally, the account manager computing device 14 can compute the return on investment for a fixed period of time or for a time within a particular range.

In step 240, the account manager computing device 14 determines the savings associated with the contact center by considering the revenue generated by the contact center after implement the identified one or more improvement areas along with the one or more historical data obtained in step 210, the cost to implement the one or more improvement areas identified in step 230, the break even period determined in step 230 and the return on investment determined in step 235. In this example, the account manager computing device 14 determines the savings associated with the contact center by comparing the revenue generated by the contact center after implement the identified one or more improvement areas against the revenue generated prior to the implementation of the identified one or more improvement areas which is obtained from the contact center one or more historical data obtained in step 210. In another example, the account manager computing device 14 can determine the savings associated with the contact center by comparing the determined break even period in step 230 against break even period obtained in the one or more contact center historical data obtained in step 210.

In step 245, the account manager computing device 14 generates a report to include the break even period determined in step 230, the return on investment determined in step 235 and the savings determined in step 240, although the report can contain any other information relating to the contact center. In this example, the account manager computing device 14 generates a report which includes graphs, charts representing the return on investment, break even period and the savings. Additionally, the account manager computing device 14 facilitates interaction with the report by allowing the user of the account manager computing device 14 to change the parameters in the report.

Accordingly, as illustrated and described with references to the examples herein, this technology makes calculating return on investment both easy and flexible. Additionally, this technology would enable an investor or customer to get projections on savings based on the investment forecast on one or more contact center applications, the break even period associated with the contact center after the investment.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing contact center operation based on an analysis of contact center data to identify improvements, the method comprising:
   dynamically obtaining by an account manager computing device contact center historical operational data and contact center projected operational data from a historical data server and a forecasted data server, respectively, and via one or more communication networks, wherein the contact center comprises a facility used by one or more enterprises to manage client contact via communication infrastructure;
   correlating by the account manager computing device at least a part of the obtained contact center historical operational data and the contact center projected operational data to determine when there are one or more improvement areas for the contact center;
   identifying by the account manager computing device stored improvement data based on the correlation, when the determining indicates that there are one or more improvement areas for the contact center, wherein the stored improvement data corresponds to one or more improvement areas for the contact center;
   determining by the account manager computing device cost data comprising one or more costs to implement one or more improvements associated with the identified one or more improvement areas in the stored improvement data;
   determining by the account manager computing device return on investment data for the contact center based on the cost data;
   graphically outputting by the account manager computing device a report comprising one or more parameters and a graphical indication of the determined return on investment to a display device; and
   facilitating by the account manager computing device interaction with the report comprising receiving a change to one or more of the parameters from an input device and dynamically and automatically adjusting the report based on the change to the one or more parameters.

2. The method as set forth in claim 1 further comprising:
   implementing by the account manager computing device the one or more improvements; and
   calculating by the account manager computing device revenue generated by the contact center after implementing the one or more improvements.

3. The method as set forth in claim 2 further comprising:
   comparing by the account manager computing device the calculated revenue after implementing the one or more improvements against a historical revenue generated by the contact center, wherein the historical revenue is included in the obtained contact center historical operational data, to determine a savings associated with the contact center; and
   calculating by the account manager computing device a break even period associated with the contact center by determining a time period required for the revenue generated after implementing the one or more improvements to be equal to the identified one or more costs to implement the one or more improvements.

4. The method as set forth in claim 1 wherein the report further comprises a graphical representation of one or more of a savings or a break even period.

5. A non-transitory computer readable medium having stored thereon instructions for optimizing contact center operation based on an analysis of contact center data to identify improvements comprising machine executable code which when executed by at least one processor, causes the processor to perform steps comprising:
   dynamically obtaining contact center historical operational data and contact center projected operational data from a historical data server and a forecasted data server, respectively, and via one or more communication networks, wherein the contact center comprises a facility used by one or more enterprises to manage client contact via communication infrastructure;
   correlating at least a part of the obtained contact center historical operational data and the contact center projected operational data to determine when there are one or more improvement areas for the contact center;
   identifying stored improvement data based on the correlation, when the determining indicates that there are one or more improvement areas for the contact center, wherein the stored improvement data corresponds to one or more improvement areas for the contact center;
   determining cost data comprising one or more costs to implement one or more improvements associated with the identified one or more improvement areas in the stored improvement data;
   determining return on investment data for the contact center based on the cost data;
   graphically outputting a report comprising one or more parameters and a graphical indication of the determined return on investment to a display device; and
   facilitating interaction with the report comprising receiving a change to one or more of the parameters from an input device and dynamically and automatically adjusting the report based on the change to the one or more parameters.

6. The medium as set forth in claim 5 further having stored thereon instructions comprising machine executable code which when executed by the processor further causes the processor to perform steps further comprising:
implementing the one or more improvements; and
calculating generated by the contact center after implementing the one or more improvements.

7. The medium as set forth in claim 6 further having stored thereon instructions comprising machine executable code which when executed by the processor further causes the processor to perform steps further comprising:
comparing the calculated revenue after implementing the one or more improvements against a historical revenue generated by the contact center, wherein the historical revenue is included in the obtained contact center historical operational data, to determine a savings associated with the contact center; and
calculating a break even period associated with the contact center by determining a time period required for the revenue generated after implementing the one or more improvements to be equal to the identified one or more costs to implement the one or more improvements.

8. The medium as set forth in claim 5 wherein the report further comprises a graphical representation of one or more of a savings or a break even period.

9. An account manager computing device comprising a processor and a memory coupled to the processor which is configured to be capable of executing programmed instructions comprising and stored in the memory to:
dynamically obtain contact center historical operational data and contact center projected operational data from a historical data server and a forecasted data server, respectively, and via one or more communication networks, wherein the contact center comprises a facility used by one or more enterprises to manage client contact via communication infrastructure;
correlate at least a part of the obtained contact center historical operational data and the contact center projected operational data to determine when there are one or more improvement areas for the contact center;
identify stored improvement data based on the correlation, when the determining indicates that there are one or more improvement areas for the contact center, wherein the stored improvement data corresponds to one or more improvement areas for the contact center;
determine cost data comprising one or more costs to implement one or more improvements associated with the identified one or more improvement areas in the stored improvement data;
determine return on investment data for the contact center based on the cost data;
graphically output a report comprising one or more parameters and a graphical indication of the determined return on investment to a display device; and
facilitate interaction with the report comprising receiving a change to one or more of the parameters from an input device and dynamically and automatically adjusting the report based on the change to the one or more parameters.

10. The device as set forth in claim 9 wherein the processor is further configured to be capable of executing at least one additional programmed instruction comprising and stored in the memory to:
implement the identified one or more improvements; and
calculate generated by the contact center after implementing the identified one or more improvements.

11. The device as set forth in claim 10 wherein the processor is further configured to be capable of executing at least one additional programmed instruction comprising and stored in the memory to:
compare the calculated revenue after implementing the identified one or more improvements against a historical revenue generated by the contact center, wherein the historical revenue is included in the obtained contact center historical operational data, to determine a savings associated with the contact center; and
calculate a break even period associated with the contact center by determining a time period required for the revenue generated after implementing the identified one or more improvements to be equal to the identified one or more costs to implement the identified one or more improvements.

12. The device as set forth in claim 9 wherein the report further comprises a graphical representation of one or more of a savings or a break even period.

13. The method as set forth in claim 1 wherein:
the contact center historical operational data comprises a total number of calls, an agent talk time, a number of call hours per agent, a hold time, interactive voice response (IVR) call minutes, a telecom cost, an agent cost per minute, a revenue generated by the contact center, or a break even period; and
the contact center projected operational data comprises forecasted data of the contact center for reduction in agent interaction, a hold time, a number of repeat/misrouted calls, an increase in IVR usage, or cost for one or more of the improvements or a maintenance associated with one or more of the improvements.

14. The medium as set forth in claim 5 wherein:
the contact center historical operational data comprises a total number of calls, an agent talk time, a number of call hours per agent, a hold time, interactive voice response (IVR) call minutes, a telecom cost, an agent cost per minute, a revenue generated by the contact center, or a break even period; and
the contact center projected operational data comprises forecasted data of the contact center for reduction in agent interaction, a hold time, a number of repeat/misrouted calls, an increase in IVR usage, or cost for one or more of the improvements or a maintenance associated with one or more of the improvements.

15. The device as set forth in claim 9 wherein:
the contact center historical operational data comprises a total number of calls, an agent talk time, a number of call hours per agent, a hold time, interactive voice response (IVR) call minutes, a telecom cost, an agent cost per minute, a revenue generated by the contact center, or a break even period; and
the contact center projected operational data comprises forecasted data of the contact center for reduction in agent interaction, a hold time, a number of repeat/misrouted calls, an increase in IVR usage, or cost for one or more of the improvements or a maintenance associated with one or more of the improvements.

* * * * *